Dec. 29, 1931. W. H. MUZZY 1,839,116
MEANS FOR INDICATING THE THERMAL CONDITIONS OF VEHICLE MOTORS
Filed Dec. 6, 1926
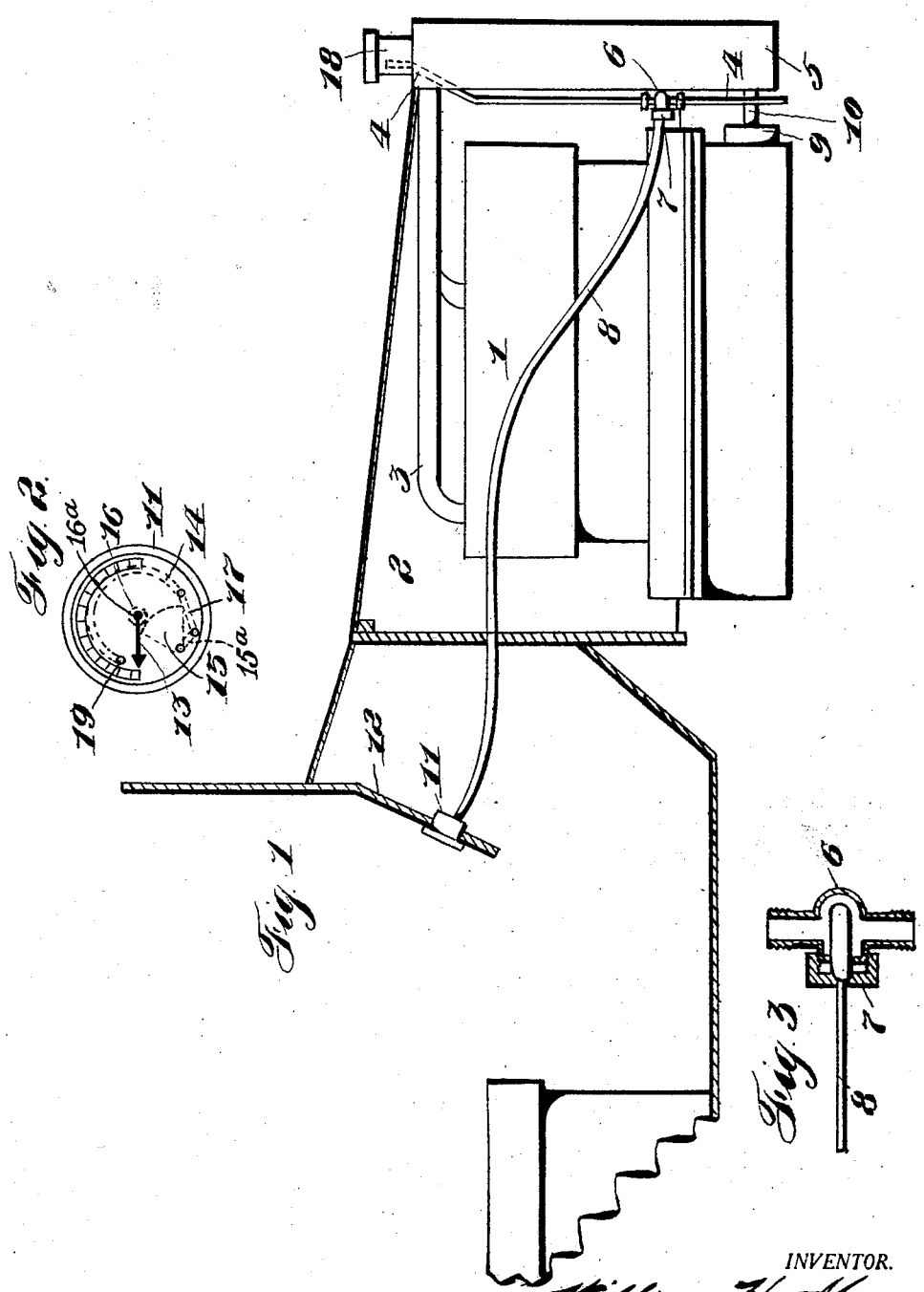
INVENTOR.
William H. Muzzy.

Patented Dec. 29, 1931

1,839,116

UNITED STATES PATENT OFFICE

WILLIAM H. MUZZY, OF EVANSTON, ILLINOIS, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

MEANS FOR INDICATING THE THERMAL CONDITIONS OF VEHICLE MOTORS

Application filed December 6, 1926. Serial No. 152,936.

This invention relates to improvements in indicators for automobiles and has more particular relation to improvements in thermal indicators for indicating at the "dash" or instrument board of the machine.

One of the several objects of the invention is to provide a thermometer that will normally indicate the "hood" temperature plus what may be added to it by discharge from the engine cooling system and minus what may be taken from it by cold air drawn into the cooling system by vacuum created by the cooling of the system.

Another object of the invention is to provide a thermal indicator for indicating the combined effect of all the heat radiating elements of the engine and its cooling system.

A further object of the invention is to provide a thermal indicator for normally indicating the combined effect of all the heat radiating elements of the engine and its cooling system under the hood and when danger is present to indicate this condition at once before the hood temperature could possibly show it.

The invention also has other objects all of which will be hereinafter more particuarly set forth and claimed.

In the accompanying drawings forming part of this specification:

Fig. 1 represents a side elevation, partly in section, of the devices embodying my invention mounted under the hood and upon the dash board of a car.

Fig. 2 represents a detail front elevation of the indicating instrument mounted on the dash, the operating Bourdon tube, links and gearing being shown in dotted lines, and Fig. 3 represents a detail side elevation, partly in section of the bulb of the thermometer tube and its mounting in the cooling system overflow pipe.

It has been found by actual tests that the temperature under the hood of an automobile which is effected by the hot air blown back from the radiator, by the engine walls and jackets, by the exhaust pipes and by the connecting water pipes and pump, by thermostatic control of the circulation of the water, by radiator shutters and by luvre covers, rises and falls practically in step with the rise and fall of the temperature of the cooling system of the engine, but lags somewhat behind the cooling system.

For general normal running this hood temperature is sufficient to inform the operator of the general temperature condition of his motor and as to its normal running condition but should overheating occur the lag of the hood temperature would apt to be too great and damage would be done before the operator would be informed of the overheating. For this reason I mount the thermometer bulb 7 in a hollow threaded T coupling 6. This T coupling is mounted by suitable compression couplings about half way down the radiator overflow pipe 4 so that the overflow from the cooling system as it escapes will pass over the thermometer bulb 7.

The bulb 7 is connected to the capillary tube 8 which in turn is connected as at 19, to the anchored end of the hollow Bourdon tube 14 mounted in the gage casing 11. The free end of the tube 14 is loosely connected in any suitable manner, as by a link 17 with a short lever 15ª fast to a gear segment 15. This segment meshes with a pinion 16 fast to a shaft 16ª which carries the indicating hand 13. This hand travels over a suitably marked dial in a manner well known in the art. In fact the operation of the Bourdon tube and the gage is old and well known in the art. The Bourdon tube, the tube 8 and the bulb 7 are of course filled with a suitable expansible liquid easily affected by heat.

The radiator 5 of the car is provided with the usual filler tube and cap 18 and is connected at the top by pipes 3 with the water jackets of the engine 1. The water pump 9 draws the water from the lower end of the radiator by pipe 10 and feeds it by suitable and usual passages in the castings to the water jackets of the engine.

The hood 2 is of the usual construction and covers the engine and its associated parts and retains the heat about it and also receives the heat from the radiator as it is blown back by the fan and the forward movement of the car.

The radiator and the other heat radiating elements under the hood such as the jackets, the exhaust pipes, the engine walls and the connecting pipes all combine to heat the T connection 6 and impart heat to the bulb 7, and the hood temperature which depends upon the general thermal condition of the engine is thus used to give a normal running temperature for the thermometer as this hood temperature rises and falls as the engine heats or cools.

When overheating occurs however the hood temperature responds too slowly to be of use in avoiding trouble and the thermometer bulb is thus placed in the overflow from the cooling system. When the cooling system heats the contents thereof expand, and air, vapor, hot water or steam passes out of the overflow 4. This immediately affects the thermometer and if the temperature of the overflow or discharge is greater than the hood temperature, then this higher temperature is made manifest by the indication of the instrument.

When the system starts to cool a partial vacuum is created in the radiator and cold air, from outside the hood and below the bottom of the radiator, is drawn through the pipe 4 and over the bulb 7. This immediately informs the operator that the cause of overheating has been removed. This cold air movement takes place as long as the radiator is cooling and the thermometer is correspondingly affected.

When the cooling stops and the engine is running under normal conditions the thermometer will again take on the hood temperature.

The radiator in heating or cooling practically "breathes" exhaling when heating and inhaling when cooling is taking place.

The very desirable "jump" or extended movement of the heat indicator is secured when danger is present with the present invention, as the thermal indicator is normally indicating 40 degrees under the actual temperature of the water in the upper part of the water jackets but just as soon as any overflow starts the thermometer responds to the temperature of the overflow so that at the boiling point this present indicator would be right in step with a thermometer which might be placed in the hot water pipe connecting the engine and the radiator.

Further the peculiar action of the vacuum in the radiator drawing in cold air past the thermometer bulb gives an immediate indication that any trouble causing overheating has been removed as it indicates this fact before a thermometer placed in the water itself would have responded materially to the change.

The bulb 7 may of course be located at any desired effective point under the hood in which it will get the most direct effect from the hot air under the hood. The overflow from the cooling system may be piped to such point.

It will also be seen that while the thermometer is normally indicating the hood temperature, the "breathing" action of the radiator will add to or subtract from this normal temperature according to the heating or cooling of the system.

The combined action really provides a rising and falling base or background (the hood temperature) and superimposed upon this the actual heat of expansion or discharge from the system and the cooling effect of cold air drawn into the system as described.

The net result of this improved construction, as compared with a thermometer with its bulb in the upper hot water pipe 3 for instance, is that with water temperatures from about 100 to 200 degrees F. the improved construction would operate approximately in step with the rise and fall but about 40 degrees lower. When the water temperature advances however from 200 to 212 degrees, the thermometer of the improved system immediately "jumps" from 160 degrees to 212 degrees and this jump is unmistakable and is immediately noticed by the operator whereas he might not notice a jump of 12 degrees at all.

When the trouble that was causing overheating is removed the thermometer in the water recedes slowly as the water cools but the present thermometer drops rapidly as the vacuum formed in the radiator by cooling draws cold air in past the thermometer bulb 7. This informs the operator at once that the overheating has ceased.

Having thus described my invention what I claim as new and desire to secure by Letters Patent is:

1. In an automobile the combination with an engine and its cooling system, of an enclosing hood for the engine, a thermometer with its bulb located to be influenced by the combined heat of the parts under the hood, and means for directing the overflow from and the air intake into the cooling system, over the thermometer bulb.

2. In an automobile the combination with an engine and its cooling system, of an enclosing hood for the engine, a thermometer with its bulb located under the hood and in proximity to the radiator, and means for directing the overflow from and the air intake into the cooling system, over the thermometer bulb.

3. In an automobile the combination with an engine and its cooling system, of an enclosing hood for the engine and associated parts, a radiator in the cooling system, a thermometer with its bulb located under the hood, and means for directing the overflow from the radiator over the thermometer bulb.

4. In an automobile the combination with an engine and its cooling system, of an enclosing hood for the engine and its associated parts, a radiator in the cooling system having an overflow pipe, a thermometer having an indicating portion outside the hood and a bulb under the hood, and means for mounting the thermometer bulb in the overflow pipe.

5. In a motor vehicle, the combination with a motor and a cooling system therefor, of a radiator overflow conduit, a temperature responsive element mounted in said conduit, and means for indicating the thermal condition of said element.

In testimony whereof I affix my signature.

WILLIAM H. MUZZY.